(12) United States Patent
Mazenq

(10) Patent No.: US 9,080,843 B2
(45) Date of Patent: Jul. 14, 2015

(54) SYSTEM FOR STEERING, ABOUT ITS AXES OF ROTATION, A MOVING BODY PROPELLED BY JET REACTION, PARTICULARLY A MISSILE

(75) Inventor: Lionel Mazenq, Issy les Moulineaux (FR)

(73) Assignee: MBDA FRANCE, Paris (FR)

( * ) Notice: Subject to any disclaimer, the term of this patent is extended or adjusted under 35 U.S.C. 154(b) by 104 days.

(21) Appl. No.: 13/988,577

(22) PCT Filed: Nov. 17, 2011

(86) PCT No.: PCT/FR2011/000609
§ 371 (c)(1),
(2), (4) Date: Jan. 9, 2014

(87) PCT Pub. No.: WO2012/069711
PCT Pub. Date: May 31, 2012

(65) Prior Publication Data
US 2014/0110524 A1    Apr. 24, 2014

(30) Foreign Application Priority Data
Nov. 24, 2010    (FR) ..................................... 10 04570

(51) Int. Cl.
*F42B 10/66*    (2006.01)
*F02K 9/90*    (2006.01)
*F42B 10/00*    (2006.01)
*F02K 9/00*    (2006.01)

(52) U.S. Cl.
CPC ................. *F42B 10/665* (2013.01); *F02K 9/90* (2013.01)

(58) Field of Classification Search
CPC ........ F42B 10/60; F42B 10/66; F42B 10/665; B64C 9/38; F02K 9/80; F02K 9/90

USPC ............ 244/3.1, 3.15, 3.21, 3.22, 158.1, 164, 244/169; 60/200.1, 228–230; 239/265.11, 239/265.13, 265.15, 265.17, 265.19, 239/265.23, 265.25, 265.27, 265.29, 239/265.31, 265.33, 265.35, 265.37, 239/265.39, 265.41, 265.43
See application file for complete search history.

(56) References Cited

U.S. PATENT DOCUMENTS

| | | | |
|---|---|---|---|
| 2,654,552 A * | 10/1953 | Jonas | 244/3.22 |
| 3,150,486 A | 9/1964 | Hollstein et al. | |
| 3,734,411 A * | 5/1973 | Wolf et al. | 239/265.29 |
| 3,946,556 A * | 3/1976 | Catterfeld | 239/265.19 |
| 3,986,683 A | 10/1976 | Ellison | |
| 4,000,854 A * | 1/1977 | Konarski et al. | 239/265.35 |
| 4,432,512 A | 2/1984 | Young | |

(Continued)

*Primary Examiner* — Barnarr Gregory
(74) *Attorney, Agent, or Firm* — Duane Morris LLP; J. Rodman Steele, Jr.; Gregory M. Lefkowitz

(57) ABSTRACT

System for steering, about its axes of rotation, a moving body propelled by jet reaction, particularly a missile. The system (1) comprises two first flow deflectors (3, 4) of which one (3) is able to act exclusively on the outlet flow from one of the nozzles (17) of the moving body (M) which is provided with two jet nozzles (17, 18), and of which the other (4) is able to act exclusively on the outlet flow from the other jet nozzle (18) of said moving body (M), these two first flow deflectors (3, 4) interacting in such a way as to be able to steer the moving body (M) about two of its three axes of rotation, and a second flow deflector (5) which is able to act on the outlet flows from the two jet nozzles (17, 18), but on just one outlet flow at a time, so as to be able to steer the moving body (M) about the third of its axes of rotation.

8 Claims, 2 Drawing Sheets

(56) References Cited

U.S. PATENT DOCUMENTS

| | | | | |
|---|---|---|---|---|
| 4,463,921 A | * | 8/1984 | Metz | 244/3.22 |
| 4,482,107 A | * | 11/1984 | Metz | 244/3.22 |
| 4,509,923 A | * | 4/1985 | Turnbull | 239/265.33 |
| 4,562,980 A | * | 1/1986 | Deans et al. | 244/3.22 |
| 4,618,094 A | * | 10/1986 | Palmer | 239/265.37 |
| 4,805,840 A | * | 2/1989 | Tape | 239/265.35 |
| 4,856,734 A | * | 8/1989 | Davies | 244/3.22 |
| 4,928,906 A | * | 5/1990 | Sturm | 244/3.22 |
| 7,434,762 B2 | * | 10/2008 | Hatalsky et al. | 244/3.21 |
| 8,387,360 B2 | * | 3/2013 | Kinsey et al. | 244/3.22 |

* cited by examiner

SYSTEM FOR STEERING, ABOUT ITS AXES OF ROTATION, A MOVING BODY PROPELLED BY JET REACTION, PARTICULARLY A MISSILE

FIELD OF THE INVENTION

The present invention relates to a system for steering a moving body propelled by jet reaction, in particular a missile, about its axes of rotation, and also a moving body provided with such a steering system.

BACKGROUND

There are three different known forms of steering generally used on modern missiles, namely:
steering by aerodynamic systems (control surfaces, canard systems);
steering by auxiliary jets; and
steering by thrust vectoring.
Included among the various thrust vectoring systems is steering by blades. In this case, blades act on the outlet flows of the nozzle(s) of the missile in order to control the orientation of the thrust of said missile. Mention can also be made of orientable nozzles or jet vanes at the outlet of a divergent component of the nozzles.

SUMMARY OF THE INVENTION

The present invention relates to a thrust vectoring system for steering a moving body propelled by jet reaction, in particular a missile, which makes it 25 possible to combine compactness, simplicity of production and reduced costs.

To that end, according to the invention, said system for steering, about its three axes of rotation, a moving body propelled by jet reaction and provided with two nozzles, this steering system having flow deflectors able to act on the outlet flows of said nozzles in such a way as to control the orientation of the thrust of the moving body, and controllable means for actuating said flow deflectors, is distinctive in that it has:
two first flow deflectors, one of which is able to act exclusively on the outlet flow of one of said nozzles and the other of which is able to act exclusively on the outlet flow of the other nozzle, these two first flow deflectors cooperating so as to be able to steer the moving body about two of its three axes of rotation, preferably the pitch axis and the roll axis; and
a second flow deflector which is able to act on the outlet flows of both jet nozzles, but on one outlet flow at a time, so as to be able to steer the moving body about its third axis of rotation, preferably the yaw axis.

Thus, by virtue of the invention, a thrust vectoring type of steering system is obtained, which enables the trajectory of a moving body (propelled by jet reaction) about all three of its axes of rotation (pitch, roll, yaw) to be controlled. In addition, as detailed below, this steering system, and particularly said flow deflectors, can be produced simply and at a reduced cost.

Furthermore, this steering system according to the invention occupies less space and is thus appropriate to missiles that are not very expensive and occupy little space.

In a preferred embodiment, at least some (but preferably all) of said flow deflectors are shaped in such a way as to:
be displaced simply by rotation; and
produce a deflection of the thrust, at each nozzle, in a cone with a maximum half-angle of approximately 12° and the vertex of which corresponds to the centre 2.5 of thrust of the corresponding nozzle.

Furthermore, advantageously, said flow deflectors have a curved profile, at least in the region of the portions of these flow deflectors intended to act on the outlet flows. This curved profile makes it possible, in particular, to avoid producing forces likely to deflect the propelled moving body along a skew trajectory.

In a preferred embodiment, said first flow deflectors are produced in the form of a deflector component with a double blade, and said second flow deflector is produced in the form of a deflector component with a single blade that is arranged between the two nozzles, which in particular enables the flow 5 deflectors to be produced simply and at a reduced cost.

In addition, advantageously, said first flow deflectors are formed so as to be displaced, in the outlet flows of the respective nozzles:
symmetrically, in order to steer the moving body about one of said two axes of rotation (assigned to these first flow deflectors), preferably the pitch axis; and
asymmetrically, in order to steer the moving body about the other of said two axes of rotation, preferably the roll axis.

Furthermore, in a particular embodiment, the steering system according to the invention comprises, in addition, means for controlling said first flow deflectors that control said flow deflectors so that they compensate, where necessary, for the unwanted effects produced by the action of said second flow deflector.

The present invention also relates to a moving body propelled by jet reaction, preferably a missile, which is provided with a steering system such as that described above.

In an application to a missile, the present invention makes it possible to have three control axes for the missile, without, however, having to use complex and expensive steering systems such as a system for steering via aerodynamic control surfaces or a system for steering via orientable nozzles or jet vanes. The present invention is thus particularly suitable for missiles of a small size, intended for use in large numbers in the context of terrestrial engagements.

BRIEF DESCRIPTION OF THE DRAWINGS

The accompanying drawings will give a clear understanding as to how the invention may be produced. In these drawings, identical reference numerals designate similar elements.

DETAILED DESCRIPTION

Figure 1:
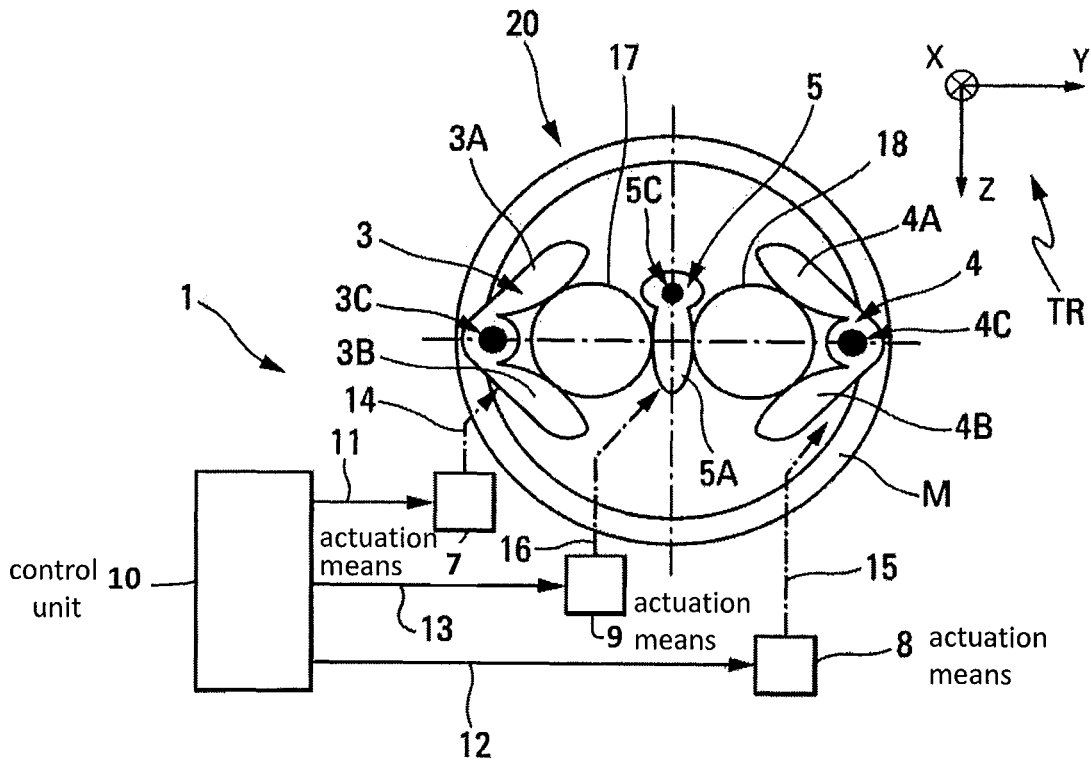
FIG. 1 is a diagrammatic illustration of the principal elements of a steering 5 system according to the invention.
Figure 2:
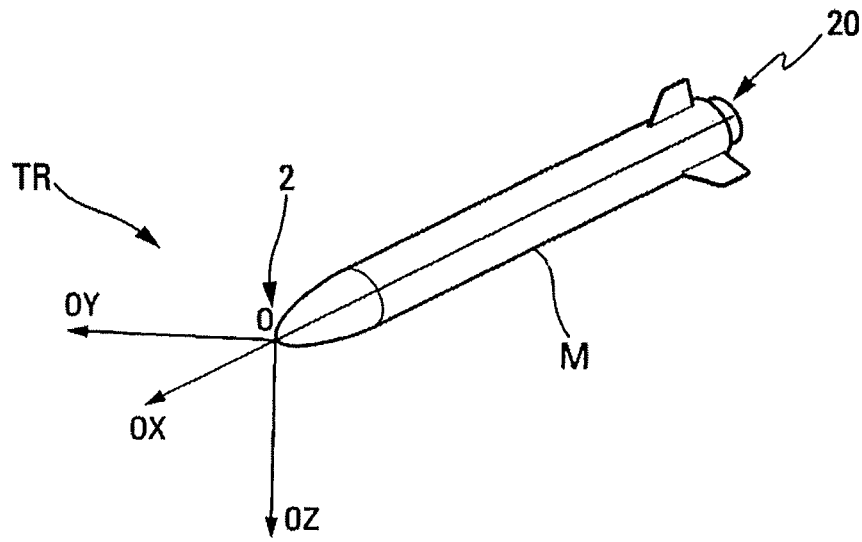
FIG. 2 is a perspective view of a missile equipped with a steering system according to the invention.

The system 1 according to the invention and shown diagrammatically in FIG. 1 is intended to assist in the steering of a moving body propelled by jet reaction, in this instance a missile M as shown by way of an example in FIG. 2, and to do so about its three axes of rotation (pitch, roll, yaw).

In the presentation of the invention given below, a reference trihedron TR (shown in FIG. 1 and FIGS. 3 to 6) is used to facilitate the description. This reference trihedron TR corresponds to the trihedron normally used, by convention, for a missile. In this reference trihedron TR, as shown in FIG. 2, the origin O is situated at the nose tip 2 of the missile M, and the axes OX, OY and OZ of said trihedron are defined as follows:

the axis OX is longitudinal relative to the propulsive body of the missile M and is oriented towards the front of said missile M;

the axis OZ is orthogonal to the longitudinal axis of the missile M and is oriented downwards; and the axis OY is defined in such a way as to form a direct trihedron with said axes OX and OZ.

Said steering system 1 is a thrust vectoring system and has, in the usual manner:

flow deflectors (or jet deflectors) 3, 4 and 5 which are able to act on the outlet flows (or jets) of the fixed nozzles 17, 18 of the missile M so as to control the orientation of the thrust of said missile; and standard actuation means 7, 8 and 9 (shown diagrammatically) for example cylinders or electric motors working in rotation, which are controlled by a standard control unit 10 (via connections 11, 12 and 13 respectively) and which displace said flow deflectors 3, 4 and 5, as illustrated diagrammatically by arrows 14, 15 and 16 shown in dot-and-dash lines, in accordance with commands received from said control unit 10 (via said connections 11, 12 and 13).

According to the invention, said steering system 1 is applied to a missile M provided with two nozzles 17 and 18 which are fixed to the rear 20 of said 2o missile M. In the embodiment shown in the drawings, the axes of the nozzles 17 and 18 are parallel to the longitudinal axis OX of the missile M, and said nozzles are arranged symmetrically relative to the plane OXZ. Thus, in the absence of obstacles at the outlet, the outlet flows of the nozzles 17 and 18 are parallel to the longitudinal axis OX of the missile M and are similar.

In addition, according to the invention, said steering system 1 has:

two flow deflectors 3 and 4 with twin blades 3A and 3B, 4A and 4B. The flow deflector 3 is able to act exclusively on the outlet flow of the nozzle 17, and the flow deflector 4 is able to act exclusively on the outlet flow of the nozzle 18. In addition, according to the invention, these two flow deflectors 3 and 4 cooperate, as detailed below, so as to be able to steer the missile M about two of its three axes of rotation, preferably the pitch axis and the roll axis; and a flow deflector 5 with a single blade 5A, which is able to act on the outlet flows of the two nozzles 17 and 18, but on one outlet flow at a time. This flow deflector 5 is positioned symmetrically between the two nozzles 17 and 18 and it can intercept the jet from either one of these two nozzles 17 and 18 in order to create a moment in the plane in which the geometric axes of the two nozzles 17 and 18 are included. This flow deflector 5 is intended to steer the missile M about its third axis of rotation, preferably the yaw axis.

The flow deflectors (or jet deflectors) 3, 4 and 5 thus comprise spoiler- or blade-type deflector elements which operate in the outlet plane of the two fixed nozzles 17 and 18.

In a preferred embodiment, said flow deflectors 3, 4 and 5 are formed so as to:

be displaced simply by rotation, around standard pivots 3C, 4C and 5C respectively, of which the axes of rotation are parallel to the longitudinal axis OX; and—produce a deflection of the thrust, at each nozzle 17, 18, in a cone with a maximum half-angle of approximately 12°. The vertex of this cone corresponds to 2o the centre of thrust of the corresponding nozzle.

In addition, said flow deflectors 3, 4 and 5 have, at least in the region of the portions of the blades 3A, 3B, 4A, 4B and 5A intended to act on the outlet flows, a curved profile, as shown for example in FIGS. 3 to 6. This curved profile makes it possible, in particular, to prevent the production of forces likely to deflect the propelled missile M along a skew trajectory.

In addition, the shape of the blades 3A, 3B, 4A, 4B and 5A can be optimised so as to minimise the losses during deflection of the propulsive jets. As for the structure of these blades, it can be adapted, in particular, to the temperature conditions at the outlet of the nozzle and to the weight allotted to the steering system 1.

Figures 3, 4:
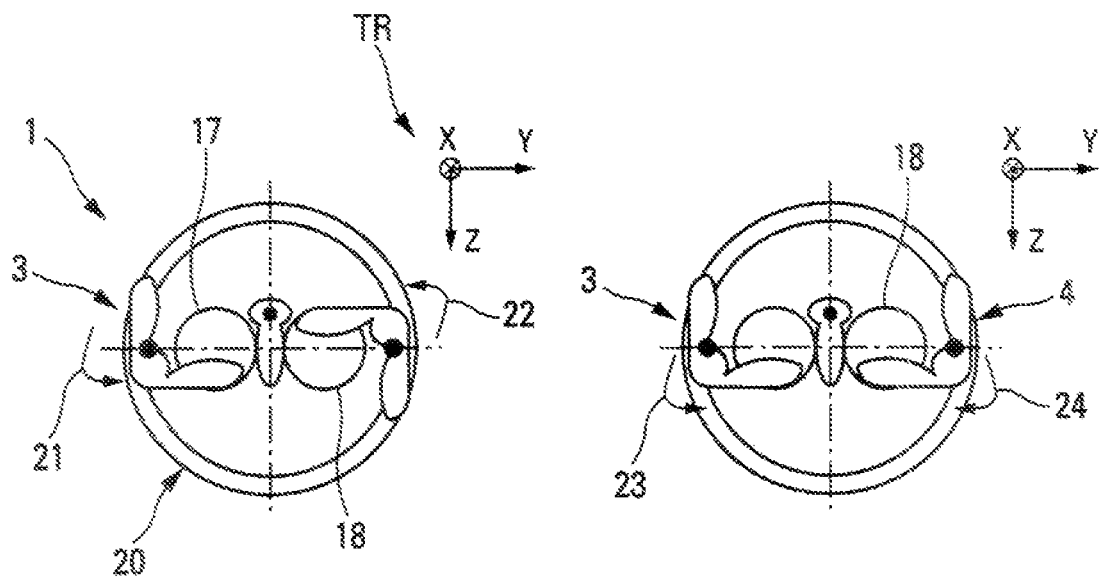
FIGS. 3 to 5 are views of the rear of a missile according to a first embodiment of the invention, illustrating the positions of the flow deflectors, in order to steer the missile about the roll, pitch and yaw axes respectively.

Furthermore, said flow deflectors 3 and 4 are displaced, in the outlet flows of the respective nozzles 17 and 18:

symmetrically, in order to steer the missile M about one of said two axes of rotation (assigned to said flow deflectors 3 and 4), preferably the pitch axis, as shown in FIG. 4; and asymmetrically, in order to steer the missile M about the roll axis, as shown in FIG. 3.

Figures 5, 6:
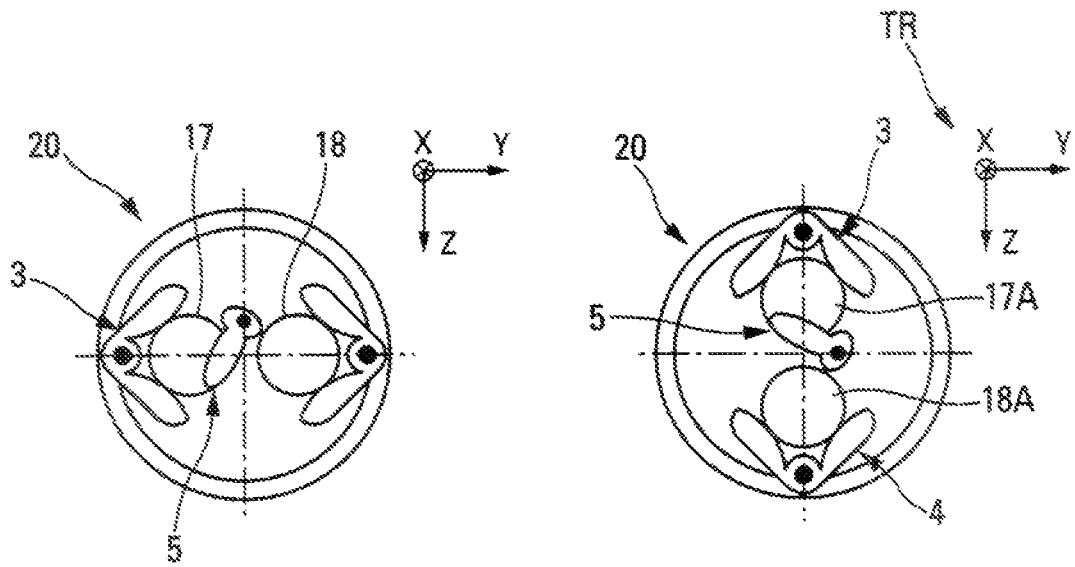
FIG. 6 is a view similar to those of FIGS. 3 to 5, showing the rear of a missile according to a second embodiment of the invention and illustrating the positions of the flow deflectors, in order to steer the missile with priority given to control over the yaw axis.

Consequently, in the example shown in FIGS. 3 to 6:

the pitch control moment is produced by introducing the flow deflectors 3 and 4 symmetrically into the jet of each nozzle 17, 18 from above or below (from the point of view of the missile axes), namely on each occasion by introducing a blade of said flow deflectors 3 and 4 with double blades 3A and 3B, 4A and 4B;

the roll control moment is produced by introducing the flow deflectors 3 and 4 asymmetrically into the jet of each nozzle 17, 18 from above or below (from the point of view of the missile axes); and the yaw control moment is produced by introducing the flow deflector 5 (situated between the two nozzles 17 and 18) into the jet of either one of these two nozzles 17 and 18 (depending on the direction desired), as shown in FIG. 5.

The control of the missile M about its three axes of rotation is thus effected by combining the three types of flow deflector movements described above.

Thus, FIGS. 3 to 5 show the positioning of the flow deflectors 3, 4 and 5 in order to produce moments about the roll axis (rotation shown by arrows 21 and 22), the pitch axis (rotation shown by arrows 23 and 24) and the yaw axis respectively.

The arrangement of the two flow deflectors 3 and 4 thus allows a biaxial (pitch/roll) control of the missile M depending on whether they are moving symmetrically or asymmetrically relative to said plane OXZ. These two flow deflectors 3 and 4 are symmetrical relative to said plane OXZ. The third flow deflector 5 alone makes yaw control possible (FIG. 5) by sweeping the outlet plane of one or other of the two nozzles 17 and 18 as required. The originality of the steering system 1 according to the invention lies, in particular, in the presence of this third flow deflector 5 disposed between the two nozzles 17 and 18, and alone making yaw control possible, by operating alternately on the outlet flows of the two nozzles 17 and 18.

As a variant, the arrangement of the nozzles in the vertical plane can be modified in accordance with the type of movement (yawing or pitching) to which priority is to be given. In the example shown in FIG. 6, the single-bladed flow deflector 5 is intended to produce pitch control (by acting on the outlet flows of nozzles 17A, 18A), and not produce yaw control as in FIG. 5.

Furthermore, in a specific embodiment, said steering system 1 has, in addition, control means (not specifically illustrated) which are, for example, integrated into the control unit 10. These control means are intended to control said flow deflectors 3 and 4 so that they act on the outlet flows of the nozzles 17 and 18 in order to compensate, as necessary, for the unwanted effects produced by the action of said flow deflector 5.

The steering system 1 according to the invention thus makes it possible to control the trajectory of a moving body (propelled by jet reaction), in particular of a missile M, about all its three axes of rotation (pitch, roll, yaw). In addition, this steering system 1 has, in particular, the following advantages: it costs less, because of the fixed nozzles and the possibility of simplifying the actuation of the movable devices; and it does not occupy much space.

In addition, as said steering system 1 does not include a complex and expensive steering device such as a steering device via aerodynamic control surfaces or a system for steering via orientable nozzles, it is particularly well-suited to missiles that are not expensive and occupy little space, in particular to missiles that are intended for use in large numbers in the context of terrestrial engagements.

The invention claimed is:

1. System for steering, about its three axes of rotation (OX, OY, OZ), a moving body (M) propelled by jet reaction and provided with two nozzles, said system having flow deflectors able to act on the outlet flows of said nozzles in such a way as to control the orientation of the thrust of the moving body (M), and also controllable means for actuating said flow deflectors, wherein said system comprises:

two first flow deflectors, one of which is able to act exclusively on the outlet flow of one of said nozzles and the other of which is able to act exclusively on the outlet flow of the other nozzle, these two first flow deflectors cooperating so as to be able to steer the moving body (M) about two of its three axes of rotation; and a second flow deflector which is able to act on the outlet flows of both jet nozzles, but on one outlet flow at a time, so as to be able to steer the moving body (M) about its third axis of rotation.

2. System according to claim 1, wherein at least some of said flow deflectors are shaped in such a way as to be displaced in rotation.

3. System according to claim 1, wherein at least some of said flow deflectors are shaped in such a way as to produce a deflection of the thrust, at each nozzle in a cone with a maximum half-angle of approximately 12° and the vertex of which corresponds to the center of thrust of the corresponding nozzle.

4. System according to claim 1, wherein at least some of said flow deflectors have a curved profile, at least in the region of the portions of these flow deflectors intended to act on the outlet flows.

5. System according to claim 1, wherein said first flow deflectors are produced in the form of a deflector component with a double blade, and in that said second flow deflector is produced in the form of a deflector component with a single blade which is arranged between the two nozzles.

6. System according to claim 1, wherein said first flow deflectors are formed so as to be displaced, in the outlet flows of the respective nozzles:

symmetrically, in order to steer the moving body (M) about the yaw axis or the pitch axis; and asymmetrically, in order to steer the moving body (M) about the roll axis.

7. System according to claim 1, wherein it also has means for controlling said first flow deflectors which are formed so as to control said flow deflectors so that they compensate for unwanted effects produced by the action of said second flow deflector on the outlet flow of a nozzle.

8. Moving body propelled by jet reaction, in particular a missile, comprising a system according to claim 1.

* * * * *